United States Patent
Daniels et al.

(10) Patent No.: US 8,984,808 B2
(45) Date of Patent: Mar. 24, 2015

(54) VERTICAL PLANTER TRAY SYSTEM

(71) Applicants: Melissa Daniels, Riverhead, NY (US); Anthony Caggiano, Westhampton, NY (US); John Matolka, Rochester, NY (US)

(72) Inventors: Melissa Daniels, Riverhead, NY (US); Anthony Caggiano, Westhampton, NY (US); John Matolka, Rochester, NY (US)

(73) Assignee: Plant Connection, Inc., Riverhead, NY (US)

( * ) Notice: Subject to any disclaimer, the term of this patent is extended or adjusted under 35 U.S.C. 154(b) by 235 days.

(21) Appl. No.: 13/645,587

(22) Filed: Oct. 5, 2012

(65) Prior Publication Data

US 2014/0096446 A1    Apr. 10, 2014

(51) Int. Cl.
*A01G 9/02* (2006.01)
*A01G 25/00* (2006.01)

(52) U.S. Cl.
CPC ..................................... *A01G 9/025* (2013.01)
USPC .................................................. 47/82; 47/83

(58) Field of Classification Search
CPC ......... A01G 9/02; A01G 27/00; A01G 9/022; A01G 31/04; A01G 31/06
USPC ................ 47/82, 83, 85, 86, 87, 46, 47, 66.5, 47/65.5, 65.9, 66.1; 312/115, 117, 118, 312/119, 120, 121, 122, 126, 127, 128, 129, 312/130, 247, 351.14
See application file for complete search history.

(56) References Cited

U.S. PATENT DOCUMENTS

| | | | | |
|---|---|---|---|---|
| 2,121,173 A * | 6/1938 | MacPherson | | 47/33 |
| 3,869,829 A * | 3/1975 | Chiosso | | 47/39 |
| 5,283,974 A * | 2/1994 | Graf, Jr. | | 47/60 |
| 7,921,599 B2 | 4/2011 | Irwin | | |
| 7,926,224 B1 * | 4/2011 | Koumoudis | | 47/65.9 |
| 8,438,781 B2 * | 5/2013 | Zhao et al. | | 47/82 |
| 2009/0223126 A1* | 9/2009 | Garner et al. | | 47/66.7 |
| 2011/0146147 A1* | 6/2011 | Irwin | | 47/66.5 |

OTHER PUBLICATIONS

ELT Living Walls (ELT), 245 King George Rd., Suite 320, Brantford, Ontario, Canada N3R 7N7, www.elteasygreen.com, Technical Information Sheet (Admitted Prior Art) (Exhibit A).
ELT Living Walls (ELT), 245 King George Rd., Suite 320, Brantford, Ontario, Canada N3R 7N7, www.elteasygreen.com, Specification (Admitted Prior Art) (Exhibit B).
Bright Green, PO Box 705, Hartland, MI 48353, www.brightgreen.com, Spec Data Sheets (Admitted Prior Art) (Exhibit C).

* cited by examiner

*Primary Examiner* — Rob Swiatek
*Assistant Examiner* — Ebony Evans
(74) *Attorney, Agent, or Firm* — Levisohn Berger LLP

(57) ABSTRACT

A vertical planting tray comprising a plurality of substantially horizontal shelves held together by outer side walls and a plurality of vertical struts located therebetween with the struts connected to and supporting the shelves, the struts being substantially thin and narrow an defining a plurality of planting stations with the horizontal shelves in which vertical plants may be grown. The substantial open wall structure between stations permits improved plant performance.

23 Claims, 5 Drawing Sheets

VERTICAL PLANTER TRAY SYSTEM

RELATED APPLICATION

This application is based on Provisional Patent Application Ser. No. 61/543,397 filed on Oct. 5, 2011 and claims the priority thereof, the contents of which are incorporated herein.

BACKGROUND OF THE INVENTION

There has been increasing use of indoor plants in many environments. Such plants can be free standing or can be held in vertical planter trays attached to a vertical surface with a plurality of locations within the tray containing soil and vegetation, which is both healthy and attractive.

Additionally, there has been increasing use of outdoor vertical growing systems, and overall the field has been growing and becoming increasingly more valuable.

There is prior art relating to vertical planter tray systems, and U.S. Pat. No. 7,921,599 is an example of one such system. Additionally, the prior art cited in the '599 patent contains other prior art relating to such vertical planter tray systems.

Generally, the prior art suffers from several problems, among which are the prevailing use of individual isolated cells contained within substantially solid walls for the growing medium contained therein. The health of the growing plants in such cells is impeded by such construction because natural healthy growth of a plant is without physical barriers, and placing artificial restraints and boundaries around the plant as it grows stunts and reduces healthy growth.

Many prior art systems limit the ability for free irrigation between neighboring plant stations by improperly restraining the flow of liquid therebetween.

An object of this invention is to provide an improved vertical tray planter system in which growth of vegetation is enhanced and not unnecessarily retarded.

Another object of this invention is to provide an improved water flow irrigation system further enhancing healthy growth of the plants contained within the system.

Yet another object of this invention is to improve water flow between adjacent growing stations, thereby maximizing irrigation and plant feeding, all while being contained within the vertical planter tray system of this invention.

Another object of this invention is to provide an easy snap in construction methodology, permitting easy assembly of the invention.

Another object is to provide an improved trough system for directing and controlling liquid flow.

Additional improvements relate to improving providing planting trays which rest in each other.

Still another object of this invention is to provide a vertical planting tray system in which there are substantially no vertical walls between stations but merely vertical struts or supports, thereby creating a minimum concept of individual cells for planting purposes without restraining growth of the vegetation contained therein.

Other objects, advantages and features of this invention will become more apparent from the following description.

SUMMARY OF THE INVENTION

This invention eliminates the substantially closed isolated cell like construction of prior art vertical tray assembly systems and opens up the entirety of the vegetation to free growth and movement of roots in any beneficial direction. Eliminating the vertical walls which formed the closed cells of prior art systems permits free growth of the vegetation and enhances and otherwise improves the general health and attractiveness of the plants contained within the present invention.

In addition to the improved, non-cellular approach to the vertical planting tray system of this invention, other improvements are provided relating to irrigation, water flow, structural support, growing medium and other parameters, all of which contribute to a healthier, more successful and more attractive vertical planting system, for use indoors or outdoors.

DETAILED DESCRIPTION

The invention is a vertical planter tray that holds plants and soil media and has the ability to be watered by hand or by using an automated drip irrigation system.

Referring to the figures, in general, the planter trays or boxes of this invention are preferably solid in the rear and outer sides. The top of the tray has a special trough design enabling drip irrigation tubing to be installed to water plants below those in the top of the tray. The trough directs water to the center of the tray where it most effectively waters the soil and plants contained in the tray below it. The bottom of the tray has holes for drainage that allows water to pass either out into the ground, into another planter tray below it, and there may be a gutter mechanism below the tray to catch excess water. The plants and soil are held in a tray on the front within a framework of horizontal soil supports that cover the front of the tray and complete box structure of the planting tray. The tray may have hook on the top so it can be hung on a ledge or bracket attached to any wall surface to orient it vertical or the planter tray can stand on end by itself.

Figure 1:
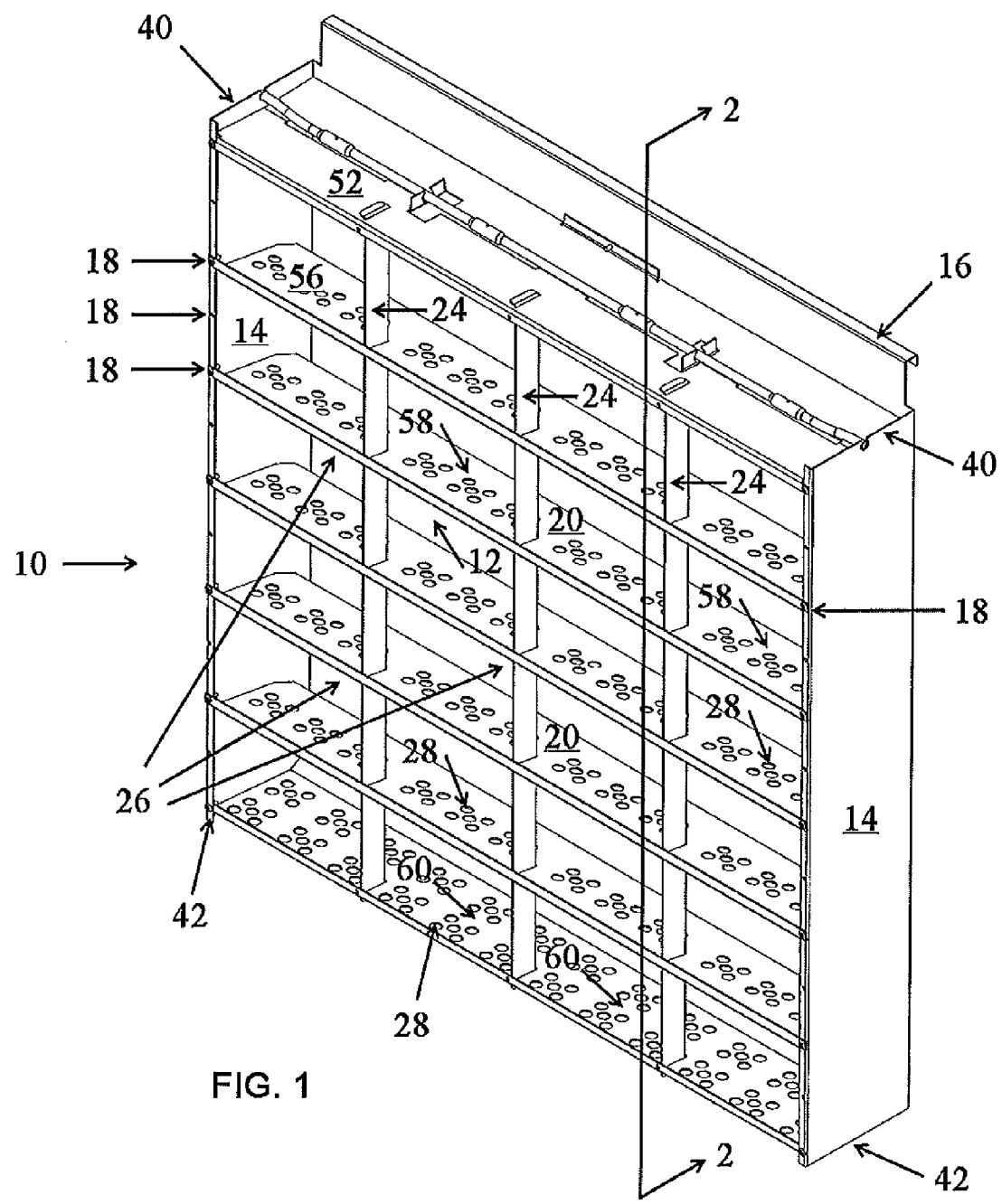
FIG. 1 is a front perspective view of the planting tray assembly system of this invention.

FIG. 1 is a perspective front view of this invention. The planting tray 10 of this invention has an impervious back 12 and sides 14 with a flange 16 on the top for hanging the panel or planting tray 10 on a bracket (not shown) for mounting on a vertical wall surface. There are other conventional ways to attach a vertical planter to be vertical such as being physically bolted to a vertical wall made of any material or to outer stone walls.

An important improvement of the present invention is the omission of closed substantially isolated cellular chambers to hold the plant and growing medium which is commonly found in prior art vertical trays, for instance, see U.S. Pat. No. 7,921,599. Prior art cell or closed chamber construction confines the plant and soil media in a plurality of small cell areas arrayed horizontally and vertically across the panel. This causes problems because holes in supporting wall structures between the cells become clogged with roots of the plants and block water passage between adjacent cells, which causes uneven flow of water throughout the panel as well as diverting water flow from areas the water naturally seeks. The prior art closed cell walls also create a surface for water to run vertically through the panels, rather than running through the soil itself.

Water always takes the path of least resistance. In the prior art closed cell technology, water runs around the soil to follow the walls of the cells to migrate from top to bottom of the panel. The present invention eliminates the isolated cell structure and water can freely move throughout the panel. There is a substantially contiguous mass of soil media throughout the entire back of the panel for water to travel through without obstruction. There is also superior root growth of the plants when they have freedom to move throughout the entire planting tray. Essentially the closed cellular structure of the prior art is replaced with horizontally and vertically arranged open plant stations.

Figure 2:
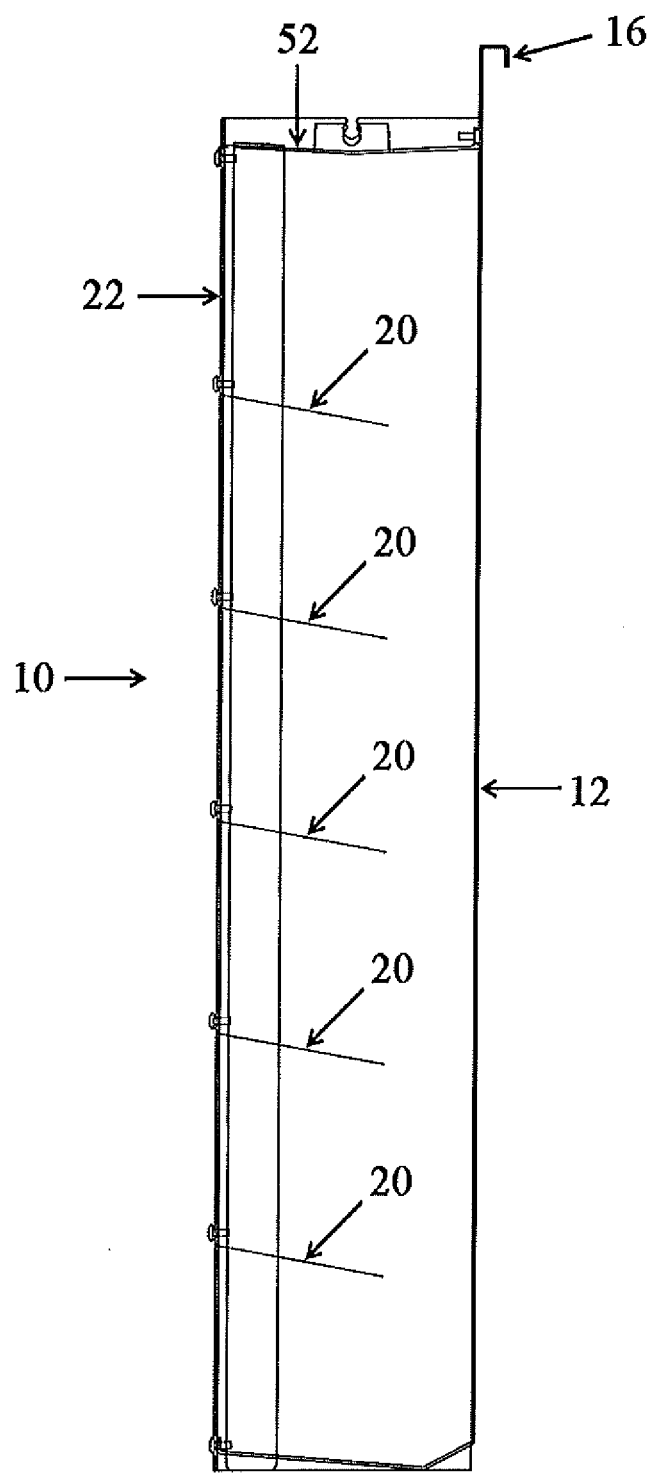
FIG. 2 is a sectional view through lines 2-2 of FIG. 1 showing the partially open rear area and shallow hollow soil supports.

Referring now to FIGS. 1 and 2, the vertical planter tray 10 comprises horizontal soil supports or planting shelves 20 that extend from the front 22 toward the rear 12 of the panel (see FIG. 2). These substantially parallel and horizontal soil supports or planting shelves 20 can be of varying depths protruding from one-half inch to three inches into the tray from the front 22 of the tray. Horizontal soil support shelf depths may be varied, which is an improved structural feature compared to the prior art, because such variation allows for adjustments based on the types of soil media and plants being planted in the vertical planter 10. This feature leaves, for example, one to three inches of open space in the back of every tray which leaves sufficient space as needed. Additionally, the rear spacing from the horizontal soil supports or planting shelves can be varied within a single vertical planter assembly.

There are vertical parallel struts 24 of a thin panel construction spaced across the planter tray 10 which support shelves 20 and with such shelves form a plurality of arrayed horizontal planting stations 26. Holes 28 are provided in the bottom of each shelf 20 for water to flow therebelow. Such struts may be evenly spaced across the planter tray or randomly located across the front of the tray.

Figure 3:
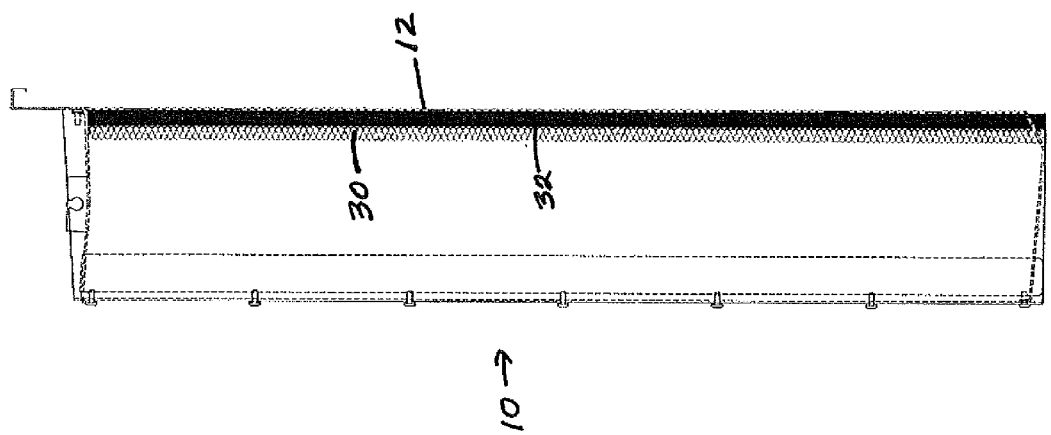
FIG. 3 is a sectional view similar to FIG. 2 showing a rear insulated wall.

FIG. 3, which is a side sectional view similar to FIG. 2, shows another feature of this invention. In particular, a layer of insulation 30 is placed and held on the back inside wall 32 behind each horizontal tray to protect the roots of the plants in the tray from extreme hot and cold temperatures is provided. This improves the performance and winter hardiness of the plants in the trays. This use of such an insulation layer 30 is possible with the present structure that provides the back of the trays partially or completely open since the shelves do not extend to the back of the tray.

Another feature of this invention is the use of a water wicking geotextile to improve water holding capacity and normalize the watering of entire panels. Cell technology has a serious flaw in that when cells in the panel get blocked by roots growing through holes in vertical partitions which form the cells, water can no longer freely flow through the entire panel and system. The soil can become dry and resistant to watering, actually starting to repel water over time. Plants in these "cells" start to die off when they can not get water. The new improved structure of this invention does not have individual isolated cells, so water flows freely throughout the tray by gravity watering all plants in its path.

Another undesirable aspect of prior art panels is that sometimes water runs around the soil and plants and is driven to the back of the panels, running down between the surface of the tray and the soil and thereby missing the plants altogether. The water wicking fabric of the present system is placed in the back of the panel in the open space to capture and absorb this water. The wet fabric "wicks" water into the soil adjacent to it by capillary action and helps keep the soil in the entire tray evenly moist and hydrated.

Many green roof products on the marketplace today utilize these water wicking fabrics to help hydrate the soil media in their systems. Other hydroponic green wall products actually grow the plants in their vertical wall systems in nothing more than these water-wicking geotextiles, but the prior art does not use such materials in conjunction with soil as in the structure of the present invention.

The planting tray structure of this invention has virtually no vertical walls, using only vertical supports or struts 24, allowing for root and water movement. Vertical supports 24 are shallow or narrow with respect to the depth of trays 20 and are used to maintain the structural integrity of the square shape of the planting tray. Such struts 24 are open and do not block the side migration of roots or confine the plants as does the prior art cell technology.

The shelves 20 may be installed at a downward slant angle as shown in FIG. 2, preventing water pooling in any area of the tray and using the force of gravity to move water freely through the soil media in the tray. The slanted shelves 20 also tend to retain the plants in place when they hang vertically so they do not fall out. These features represent further improvements over prior technologies. In addition, the shelves 20 and vertical supports 24 may be moved to adjust the angles of the shelves. This renders the planting tray system adjustable, which contrasts to fixed shelf systems of the prior art.

The present slanted shelves 20 may be are of varying depths and configurations and can be adjusted to hold plants in place so they can be planted and be hung immediately.

The assembly of FIG. 1 is riveted together as at 18, creating a rigid panel framework on the front. This differs from prior art technology which has an internal network of cells that are slid into an outside box. Another feature of the present invention is the provision of rivet holes spaced every two inches from top to bottom of the planting tray. This permits placing the shelves 20 as desired vertically, rendering the tray of this invention adjustable according to soil, plants, and planting pattern required for a particular green wall project. Adjustable horizontal soil supports 20 allow for multiple sized planting grids to be within a single or group of panels, aiding in the patterning process. Horizontal soil supports 20 can be spaced vertically every two inches, every four inches, every six inches, and so on to change the configuration of planting for the planting tray. Additionally, the supports need not be uniformly located. This also allows us for more flexibility in the sizes of plants that can be planted in the wall. The horizontal soil supports 20 can be placed closer together so they squeeze together and hold the plants in place when they are hanging vertically and help keep them from falling out. Additionally, the two inch spacing is illustrative and other spacing dimensions may be used.

The width of the planting tray at the top and bottom 40 and 42, respectively, differ by a small amount, for example one-quarter inch with the bottom 42 being smaller than top 40. This tapering built into the sides of the planting trays 10, helps to control and direct the water path from planter to planter by allowing the bottom of one wall planter to sit in and nest in the top of a lower wall planter. Multiple planters can be used this way to assemble a larger vertical planter tray unit.

Figure 4:
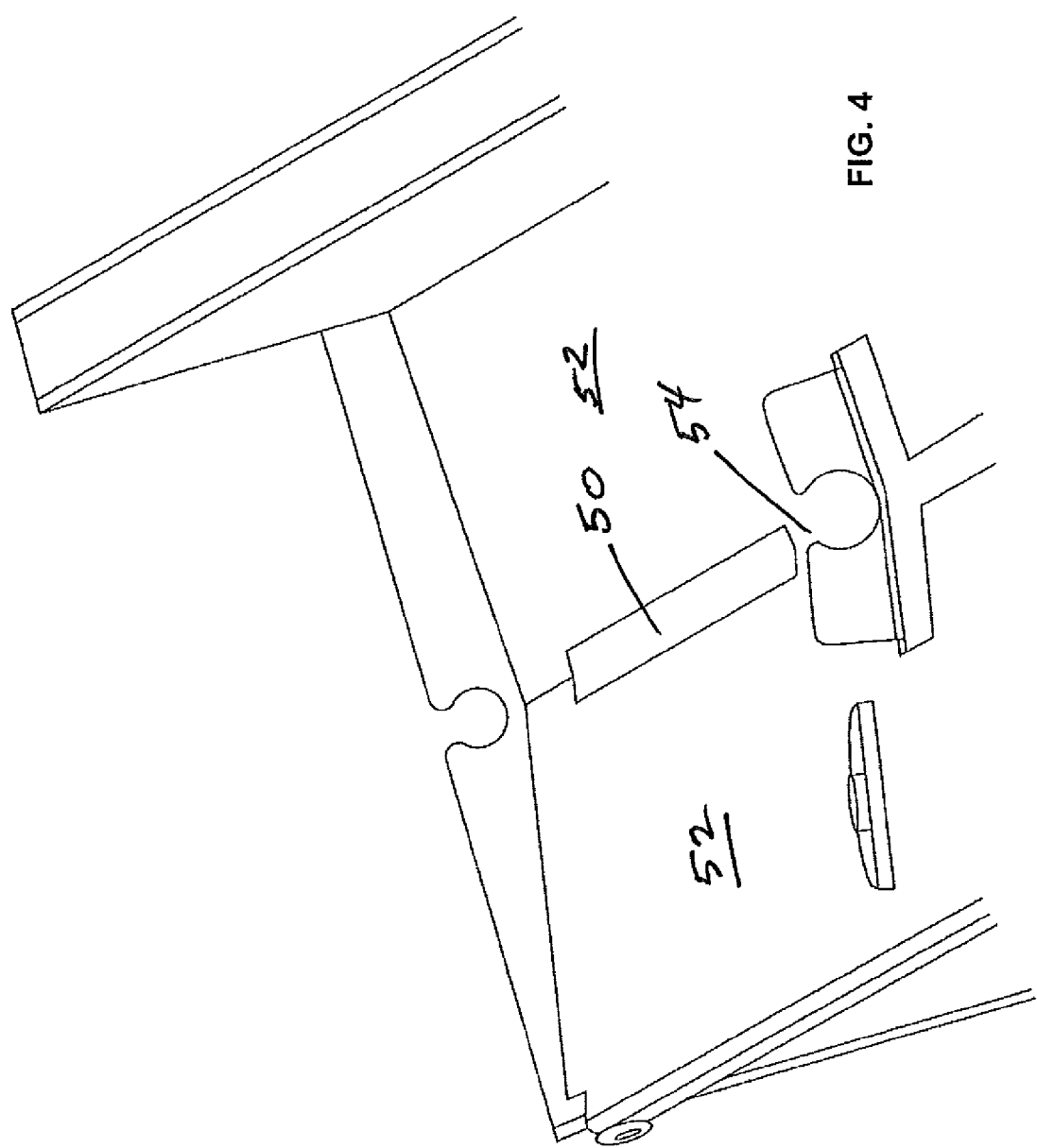
FIG. 4 is a top partial perspective view of the irrigation trough of this invention.

FIG. 4 is a partial top perspective view of a unique irrigation trough 50 on a top horizontal support structure 52 which directs the water from the irrigation line which brings water to the top center 54 of the panel 52 (front to rear), allowing a more even distribution of water. The top of the panel is pitched inwardly at an angle from each outer side creating a trough in the center. All water is forced by gravity into this channel 50 and drips directly into the center of the below planting tray 56 onto the soil contained therein. Prior art systems have holes which are located toward the back of the panel. Water tends to run into these holes and run down the back of the panel surface between the tray and the soil, substantially missing the soil and plants altogether. The design of the present invention forces the water to be directed onto the soil and plants.

Figure 5:
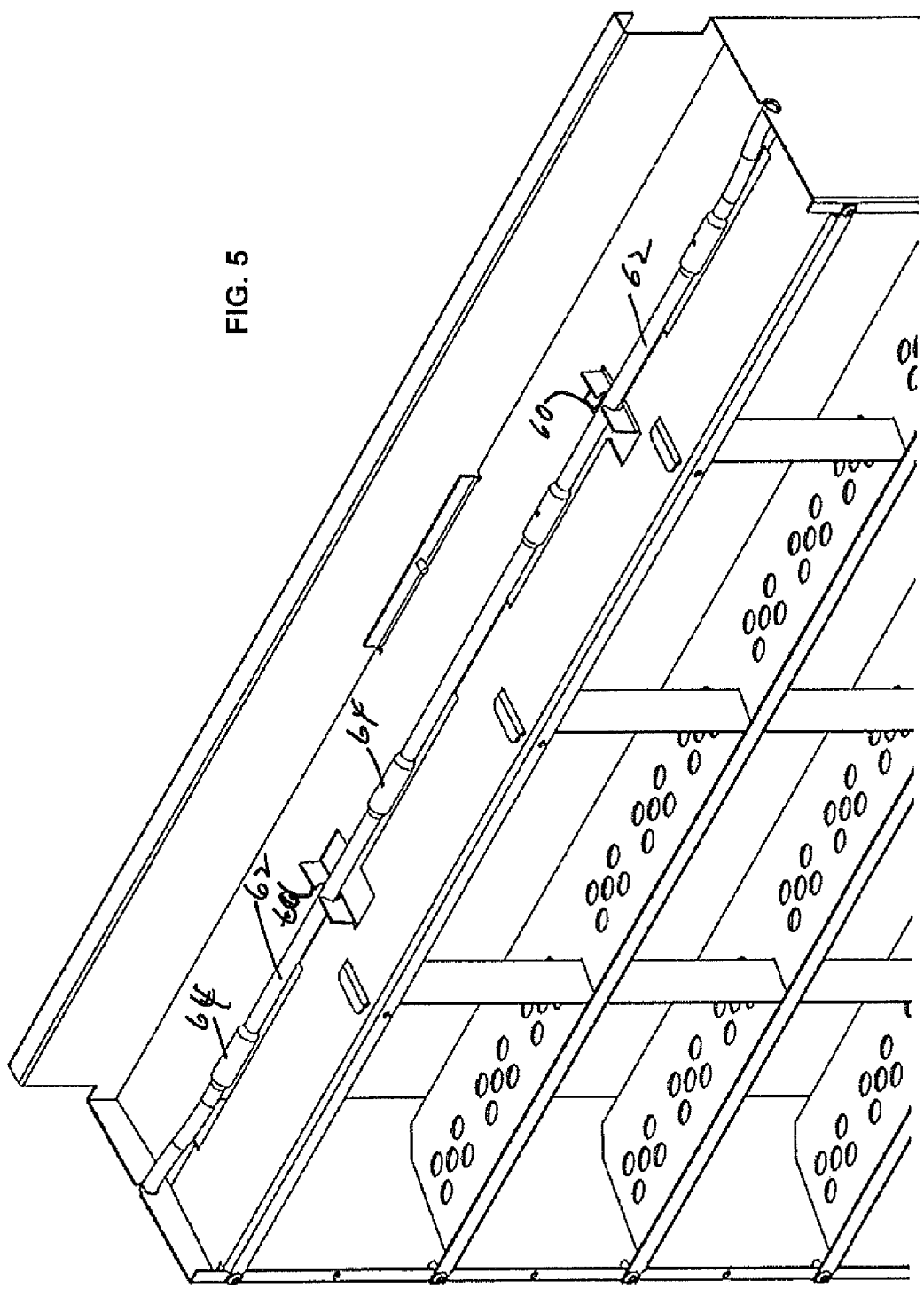
FIG. 5 is top perspective view of the present invention employing snap in connections simplifying the assembly of the invention.

FIG. 5 is a top partial perspective view of this planter showing a snap in assembly 60 on the top horizontal supports 52 of each tray which holds the irrigation tubing system 62 in place, allowing water emitters 64 to pass from cell to cell, yet being contained within the boundaries of the panel. This prevents the irrigation tubing 62 from slipping out during or after installation, which is a problem with prior art systems. It also allows installation of the present plant system to be accomplished more quickly and to efficiently ensure proper placement of emitters 64 for proper water delivery to plants and soil in tray below. The planter of this invention could also be assembled with prior art techniques, which would not be as desirable. Further, carrying water to the top of the planter 10 and distributing it through tubing 62 and emitters 64 is one illustrative way to water the plants below in the tray.

The hole patterns 58 and 60, for water drainage for each shelf which prevents water pooling allowing greater water movement as is shown in FIG. 1. The same pattern 50 is provided on all horizontal soil shelves 20 except the bottom shelf allowing the water movement and superior root migration. Inadequate drainage in the bottom of a planter can cause root rot and other fungal problems that are detrimental to plant health. This design of the present invention maximizes drainage and ensures proper oxygen is available for the plants at the root level for growth and health by providing greater and larger hole pattern placement in the bottom shelf.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The invention claimed is:

1. A vertical planter tray system comprising:
    an arrayed plurality of planting stations formed in said planter tray,
    said planter tray comprising fixed outer side walls connected to a plurality of substantially parallel and horizontal shelves, and a rear wall connected to said side walls, said rear wall having a top,
    said side walls defining a depth for said planter tray,
    each of said plurality of shelves comprising patterns of drain holes permitting water to pass downwardly therethrough, said plurality of shelves comprising a bottom shelf,
    at least one vertical strut located between said outer side walls, said vertical strut attached to and supporting said plurality of shelves,
    said plurality of planting stations formed on said plurality of shelves between said strut and said side walls,
    said plurality of shelves having a depth less than the depth of said planter tray providing space between the rear of said plurality of shelves and the rear wall of said planter tray; and
    wherein said vertical strut comprises a depth which is less than the depth of said plurality of shelves permitting substantially free access between adjacent ones of said plurality of planting stations.

2. A vertical planter tray system according to claim 1, further comprising a plurality of vertical struts located between said outer side walls forming said arrayed plurality of planting stations.

3. A vertical planter tray system according to claim 2, wherein at least one of said plurality of vertical struts is separated from adjacent vertical struts by substantially equal distances.

4. A vertical planter tray system according to claim 2, wherein at least one of said plurality of vertical struts is unequally separated from adjacent vertical struts.

5. A vertical planter tray system according to claim 2, wherein said plurality of vertical struts comprise a depth which is less than the depth of said plurality of shelves permitting substantially free access between adjacent stations.

6. A vertical planter tray system according to claim 2, wherein said plurality of shelves and said plurality of vertical struts form a rectilinear array of a plurality of planting stations.

7. A vertical planter tray system according to claim 2, wherein at least some of said plurality of shelves are slanted downwardly toward the rear wall.

8. A vertical planter tray system according to claim 2, wherein all of said plurality of shelves are parallel to each other and are slanted downwardly toward the rear wall.

9. A vertical planter tray system according to claim 2, wherein said plurality of vertical struts comprise a thin panel construction.

10. A vertical planter tray system according to claim 1, further comprising an insulating layer attached to the rear wall facing said arrayed plurality of planting stations.

11. A vertical planter tray system according to claim 1, further comprising means to attach said planter tray to a vertical surface.

12. A vertical planter tray system according to claim 11, wherein said means to attach comprises a bracket at the top of said rear wall.

13. A vertical planter tray system according to claim 1, wherein said bottom shelf has a pattern of drain holes which is different from the pattern of drain holes on other of said plurality of shelves in said planter tray.

14. A vertical planter tray system according to claim 1, wherein at least some of said plurality of shelves are slanted downwardly toward the rear wall.

15. A vertical planter tray system according to claim 1, wherein all of said plurality of shelves are parallel to each other and are slanted downwardly toward the rear wall.

16. A vertical planter tray system according to claim 1, further comprising geotextile material located proximate said plurality of planting stations when plants are in said plurality of planting stations, said geotextile material enhancing water retention and distribution.

17. A vertical planter tray system according to claim 1, wherein said horizontal shelves are riveted to said side walls.

18. A vertical planter tray system according to claim 1, wherein at least some of said horizontal shelves are evenly spaced from each other top to bottom of said planter tray.

19. A vertical planter tray system according to claim 1, wherein at least some of said horizontal shelves are unevenly spaced from each other.

20. A vertical planter tray system according to claim 1, wherein said outer side walls are slightly tapered inwardly from top to bottom.

21. A vertical planter tray system comprising
an arrayed plurality of planting stations formed in said planter tray,
said planter tray comprising fixed outer side walls connected to a plurality of substantially parallel and horizontal shelves, and a rear wall connected to said side walls, said rear wall having a top,
said side walls defining a depth for said planter tray,
each of said plurality of shelves comprising patterns of drain holes permitting water to pass downwardly therethrough,
said plurality of shelves comprising a bottom shelf, at least one vertical strut located between said outer side walls, said vertical strut attached to and supporting said plurality of shelves,
said plurality of planting stations formed on said plurality of shelves between said strut and said side walls,
said plurality of shelves having a depth less than the depth of said planter tray providing space between the rear of said plurality of shelves and the rear wall of said planter tray; and
further comprising a top support shelf structure located above said stations, said top support structure comprising a trough substantially centrally located from front to rear of said planter tray facilitating effective watering of plants in said plurality of planting stations on said plurality of shelves below said top support structure.

22. A vertical planter tray system according to claim 21, wherein said top support structure comprises a pair of panels extending across said tray and each being slanted downward toward said trough between said front and rear of said tray to facilitate water flow to said trough.

23. A vertical planter tray system according to claim 22, further comprising a water supply tube having water emitters to eject water therefrom onto said top support structure, said top support structure comprising open slots and said water supply tube being fixedly snapped into and held in said open slots.

* * * * *